Sept. 29, 1931.  J. SCHULTE  1,825,550
SETTLING TANK
Filed Nov. 13, 1929
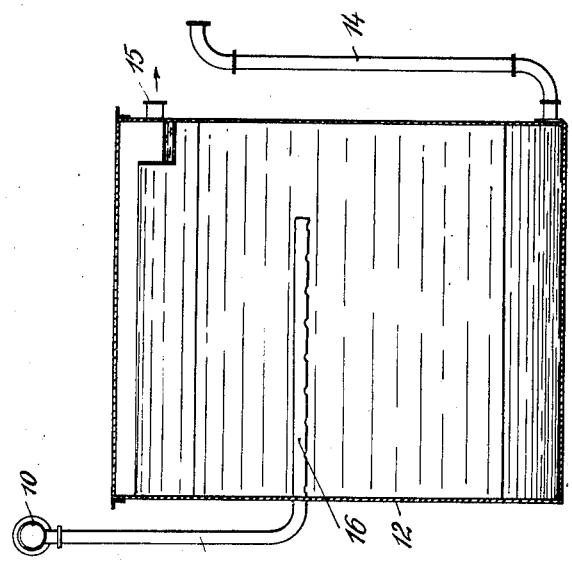
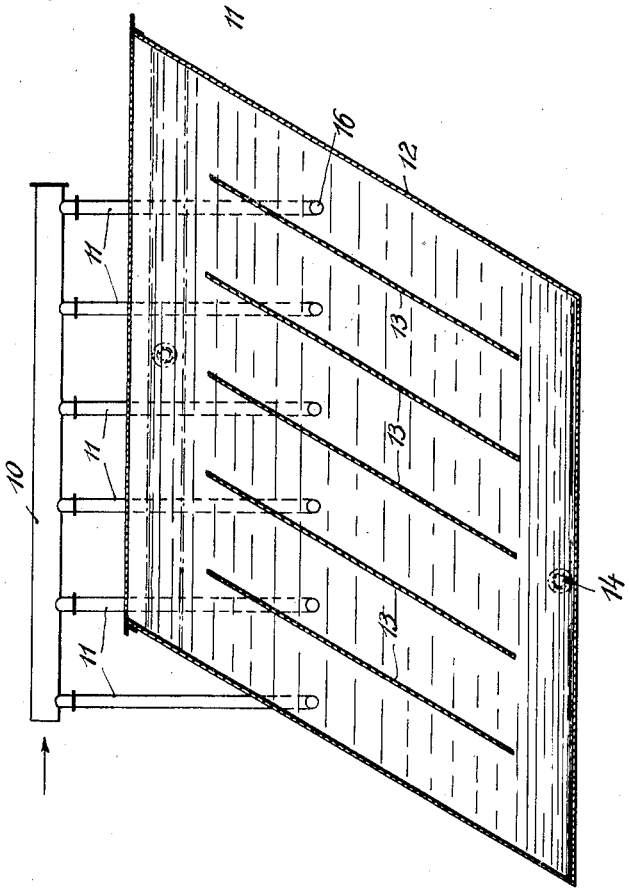
Inventor:
Johannes Schulte
by
Atty.

Patented Sept. 29, 1931

1,825,550

UNITED STATES PATENT OFFICE

JOHANNES SCHULTE, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

SETTLING TANK

Application filed November 13, 1929, Serial No. 406,889, and in Germany July 4, 1928.

My invention refers to means for causing solid matter suspended in a liquid to settle down and separate from this liquid, and also for separating two liquids of different specific gravities. It has particular reference to a settling tank in which the separation can be effected in a continuous manner.

In the drawings affixed to the specification and forming part thereof a settling tank embodying my invention is illustrated diagrammatically by way of example.

In the drawings

Fig. 1 is a vertical longitudinal section and

Fig. 2 is a cross section.

Referring to the drawings, 12 is a tank, the two end walls of which extend at an angle other than a right angle to the bottom and in parallel to each other, one of these walls thus enclosing an obtuse angle with the bottom. A number of partitions 13 is arranged in the tank in parallel with this last mentioned wall and these partitions, therefore, extend in oblique position relative to the bottom of the tank.

Perforated pipes 16 supplied with the mixture of liquids or liquid and solid matter from a main 10 through branch pipes 11 extend into the tank across one of its vertical side walls, one such pipe 16 extending to the rear of each partition 13 and substantially in parallel with the bottom of the tank. 14 is an exhaust pipe communicating with the bottom portion of the tank and 15 is an overflow in the top portion.

The mixture of liquids of different specific gravity or of a liquid and solid matter suspended therein is supplied to the tank through the main 10, branch pipes 11 and perforated pipes 16. On the mixture escaping from the perforations of the pipes 16, the heavier constitutent will sink down in the liquid filling the tank and will glide on the inclined surface of the adjoining partition 13 or the side wall 12. On the other hand the constituent of lighter specific gravity will ascend in the liquid and will be guided by the rear surface of the adjoining partition. In this way the tank is subdivided into a plurality of sections, in each of which separation of the two constituents of the mixture takes place in such manner that each constituent is guided by an inclined surface and remixing, eddying, and the formation of whirls are prevented from taking place.

As appears from the drawings, the perforated feed pipes 16 being disposed near the rearwardly inclined surfaces of partitions 13 and far above the bottom edges and far below the upper edges are disposed so as to be intermediate the upper and lower edges of the partitions in said tank and the outlets therefor. Consequently the liquid may enter the tank intermediate the levels for different liquids so that both the lighter and the heavier constituents move in opposite directions due to their differences in specific gravity, and separation is accelerated by the tendency of the heavier constituents to descend and the lighter constituents to rise. Moreover, being intermediate the two levels, the respecting constituents do not cross the paths of the other constituents in the bath and therefore interference of the descending constituents with the rising lighter constituents does not occur so that the time required for separating the two kinds of constituents is minimized. Furthermore, in addition to the foregoing the newly added liquid being introduced intermediate the levels for two materials of differing specific gravity does not tend to short circuit to the outlets before fully separated as it would were the newly added liquid fed into the tank near the upper surface thereof or near the bottom of the tank.

The heavier constituent will settle at the bottom of the tank and can be drawn off through pipe 14, while the lighter constituent will collect in the top portion of the tank and will escape through the overflow 15.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. Settling tank comprising two opposite end walls enclosing with the tank bottom an angle other than a right angle, a plurality of spaced overlapping partitions extending in parallel to one of said end walls and to each other, so as to leave gaps between the bottom ends and the tank bottom, upper and lower outlets for said tank, and perforated feed pipes extending between two adjoining partitions and between one of said end walls and partition adjoining the same, near the rearwardly inclined surfaces far below the top edges and far above the bottom edges thereof so as to deliver the liquid into the tank intermediate the upper and lower edges of the partitions in the tank and the outlets therefor.

2. Settling tank comprising two opposite, spaced, overlapping side walls extending substantially parallel at an angle other than a right angle to the tank bottom, upper and lower outlets for said tank, and a perforated inlet feed-pipe extending horizontally near the rearwardly inclined surface of the uppermost side wall far above the bottom edge thereof and far below the top edge of said side wall so as to be intermediate the upper and lower edges of the uppermost side wall in said tank and the outlets therefor.

3. Settling tank comprising a partition extending downwardly in the tank at an angle other than a right angle to the tank bottom, upper and lower outlets for said tank, and a perforated inlet feed-pipe extending horizontally near the inclined surface of said partition far above the bottom edge thereof and far below the top edge of said partition and so as to be intermediate the upper and lower edges of the partition in said tank and the outlets for said tank.

In testimony whereof I affix my signature.

JOHANNES SCHULTE.